US009467591B2

(12) United States Patent
Tanimoto

(10) Patent No.: US 9,467,591 B2
(45) Date of Patent: Oct. 11, 2016

(54) IMAGE PROCESSING APPARATUS CAPABLE OF COMMUNICATING WITH A MOBILE TERMINAL

(71) Applicant: BROTHER KOGYO KABUSHIKI KAISHA, Nagoya-shi, Aichi-ken (JP)

(72) Inventor: Satoshi Tanimoto, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/492,361

(22) Filed: Sep. 22, 2014

(65) Prior Publication Data

US 2015/0085312 A1 Mar. 26, 2015

(30) Foreign Application Priority Data

Sep. 25, 2013 (JP) ................................ 2013-197769

(51) Int. Cl.
  *G06K 15/00* (2006.01)
  *H04N 1/32* (2006.01)
  *H04N 1/00* (2006.01)
  *H04N 1/333* (2006.01)
  *G06F 3/12* (2006.01)
  *H04M 1/725* (2006.01)

(52) U.S. Cl.
  CPC ...... *H04N 1/32122* (2013.01); *H04N 1/00307* (2013.01); *G06F 3/1292* (2013.01); *H04M 1/7253* (2013.01); *H04N 1/00342* (2013.01); *H04N 1/333* (2013.01); *H04N 2201/006* (2013.01); *H04N 2201/0094* (2013.01); *H04N 2201/3254* (2013.01); *H04N 2201/3273* (2013.01)

(58) Field of Classification Search
  None
  See application file for complete search history.

(56) References Cited

U.S. PATENT DOCUMENTS

| 2006/0290680 | A1* | 12/2006 | Tanaka | H04N 1/00204 345/173 |
| 2010/0097641 | A1* | 4/2010 | Takeshita | 358/1.15 |
| 2012/0033262 | A1* | 2/2012 | Sakurai | 358/1.15 |
| 2012/0182432 | A1* | 7/2012 | Okamoto et al. | 348/207.1 |
| 2013/0083357 | A1* | 4/2013 | Suzuki | 358/1.15 |
| 2013/0083358 | A1* | 4/2013 | Suzuki | 358/1.15 |
| 2013/0188215 | A1* | 7/2013 | Kato | 358/1.14 |
| 2013/0258404 | A1* | 10/2013 | Tabata et al. | 358/1.15 |

FOREIGN PATENT DOCUMENTS

JP 8-328797 A 12/1996

* cited by examiner

*Primary Examiner* — Miya J Cato
(74) *Attorney, Agent, or Firm* — Merchant & Gould P.C.

(57) ABSTRACT

An image processing apparatus for switching its state between a first state and a second state includes: a processing unit; a communicator for communicating with a mobile terminal; a storage storing a terminal identifier, first orientation information, and second orientation information; and a controller. The controller successively receives orientation information indicating an orientation of the mobile terminal from the mobile terminal through the communicator. When the controller successively receives the first orientation information and the second orientation information from the mobile terminal identified by the terminal identifier, the controller switches the state of the image processing apparatus from one of the first state and the second state to another of the first state and the second state.

7 Claims, 9 Drawing Sheets

FIG.4A

| No | ACCOUNT INFORMATION | TERMINAL IDENTIFIER | LOCK ORIENTATION INFORMATION | UNLOCK ORIENTATION INFORMATION | EXECUTABLE PROCESSING |
|---|---|---|---|---|---|
| 1 | USER A | 15:61:3D:4E:A3:05 | 0° | 90° | COLOR PRINT, DOUBLE-SIDE PRINT |
| 2 | USER B | 51:3B:48:21:0A:66 | 270° | 0° | COLOR PRINT |
| 3 | USER C | NON-REGISTERED | NON-REGISTERED | NON-REGISTERED | PHOTO PRINT |
| ... | ... | ... | ... | ... | ... |

FIG.4B

| No | ACCOUNT INFORMATION | TERMINAL IDENTIFIER | LOCK ORIENTATION INFORMATION | UNLOCK ORIENTATION INFORMATION | EXECUTABLE PROCESSING |
|---|---|---|---|---|---|
| 1 | USER A | 15:61:3D:4E:A3:05 | 0° | 90° | COLOR PRINT, DOUBLE-SIDE PRINT |
| 2 | USER B | 51:3B:48:21:0A:66 | 270° | 0° | COLOR PRINT |
| 3 | USER C | 38:2B:41:8E:07:9C | 0° | 90° | PHOTO PRINT |
| ... | ... | ... | ... | ... | ... |

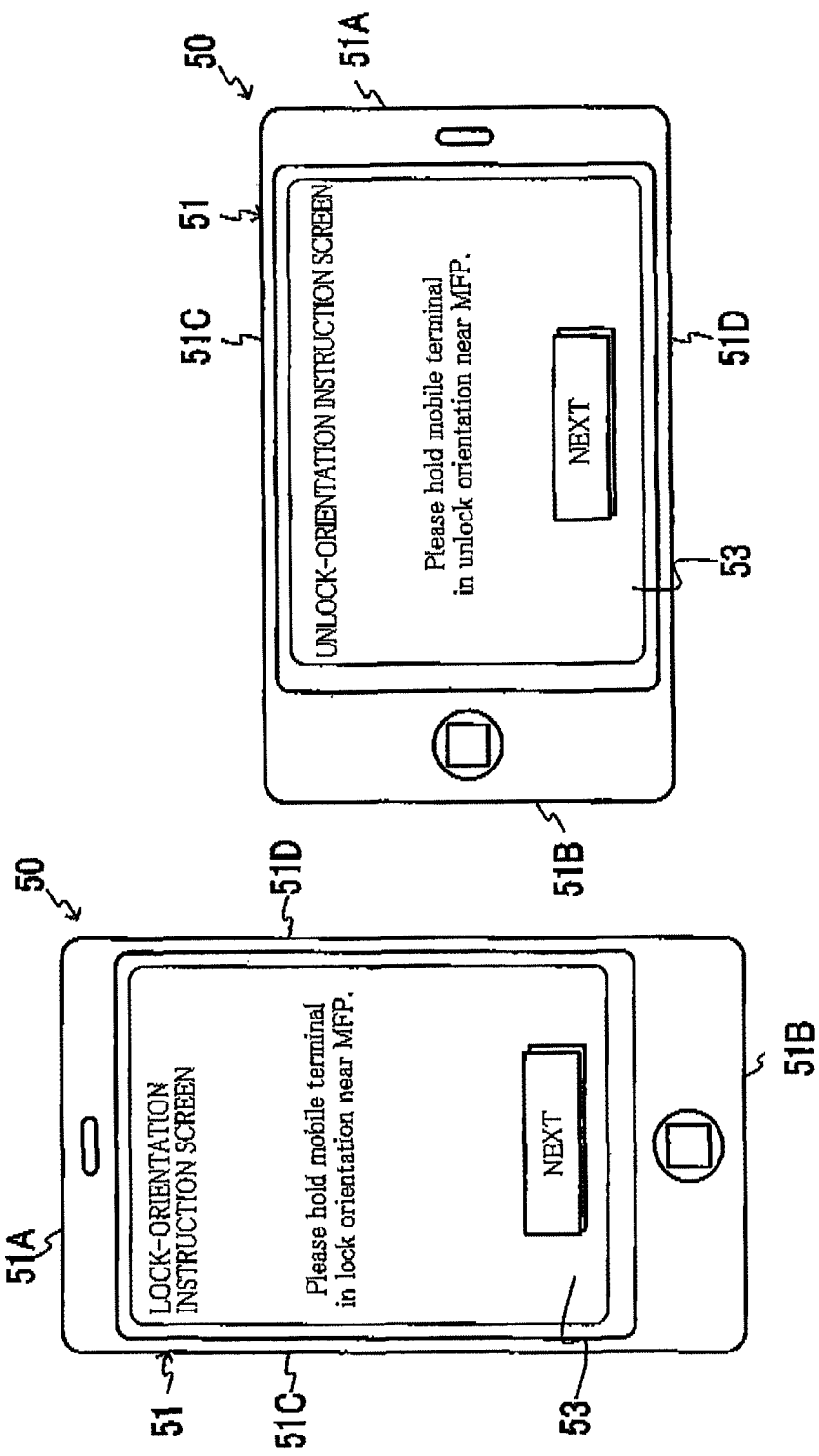

IMAGE PROCESSING APPARATUS CAPABLE OF COMMUNICATING WITH A MOBILE TERMINAL

CROSS REFERENCE TO RELATED APPLICATION

The present application claims priority from Japanese Patent Application No. 2013-197769, which was filed on Sep. 25, 2013, the disclosure of which is herein incorporated by reference to its entirety.

BACKGROUND

1. Technical Field

The present invention relates to an image processing apparatus which lifts restrictions on processing by login.

2. Description of Related Art

There has been known an image processing apparatus having a function (hereinafter, it is referred to as "Secure Function") in which restrictions on processing that is executable in the image processing apparatus are lifted by performing login. For example, there is known an image processing apparatus in which input of a user ID and a password allows the image processing apparatus to execute processing that is permitted to a user assigned with the user ID. Therefore, the image processing apparatus can set processing whose execution is permitted to all users, and processing whose execution is permitted to only specific users.

SUMMARY

In the conventional image processing apparatus, however, input of a user ID and a password is required in every usage, resulting in lower operability. Further, there is a possibility that a leakage of the user ID and the password unfortunately enables a user having no authority of execution to execute the specific processing.

The present invention has been developed to provide a highly secure image processing apparatus capable of placing or lifting restrictions on executable processing with intuitive operation.

The present invention provides an image processing apparatus configured to switch a state thereof between a first state and a second state. The image processing apparatus includes: a processing unit configured to perform processing for image data, processing performed in the first state being different from processing performed in the second state; a communicator configured to communicate with a mobile terminal; a storage configured to store a terminal identifier for identifying the mobile terminal, first orientation information indicating a first orientation of the mobile terminal, and second orientation information indicating a second orientation of the mobile terminal which is different from the first orientation, in association with each other; and a controller. The controller is configured to successively receive orientation information indicating an orientation of the mobile terminal, from the mobile terminal through the communicator; and switch the state of the image processing apparatus from one of the first state and the second state to another of the first state and the second state when the controller successively receives the first orientation information and the second orientation information from the mobile terminal identified by the terminal identifier, the first orientation information and the second orientation information being stored in the storage in association with the terminal identifier.

The present invention also provides a state switching method of switching a state of an image processing apparatus between a first state and a second state. The image processing apparatus includes: a processing unit configured to perform processing for image data, processing performed in the first state being different from processing performed in the second state; a communicator configured to communicate with a mobile terminal; and a storage configured to store a terminal identifier for identifying the mobile terminal, first orientation information indicating a first orientation of the mobile terminal, and second orientation information indicating a second orientation of the mobile terminal which is different from the first orientation, in association with each other. Wherein the method comprises steps of: successively receiving orientation information indicating an orientation of the mobile terminal through the communicator, and switching the state of the image processing apparatus from one of the first state and the second state to another of the first state and the second state when the image processing apparatus successively receives the first orientation information and the second orientation information from the mobile terminal identified by the terminal identifier, the first orientation information and the second orientation information having been stored in the storage in association with the terminal identifier.

The present invention also provides a non-transitory storage medium configured to store a plurality of instructions which are executed by a processor of an image processing apparatus configured to switch a state of the image processing apparatus between a first state and a second state. The image processing apparatus includes: a processing unit configured to perform processing for image data, processing performed in the first state being different from processing performed in the second state; a communicator configured to communicate with a mobile terminal; and a storage configured to store a terminal identifier for identifying the mobile terminal, first orientation information indicating a first orientation of the mobile terminal, and second orientation information indicating a second orientation of the mobile terminal which is different from the first orientation, in association with each other. When the plurality of instructions are executed by the processor, the plurality of instructions cause the image processing apparatus to: successively receive orientation information indicating an orientation of the mobile terminal through the communicator; and switch the state of the image processing apparatus from one of the first state and the second state to another of the first state and the second state when the image processing apparatus successively receives the first orientation information and the second orientation information from the mobile terminal identified by the terminal identifier, the first orientation information and the second orientation information having been stored in the storage in association with the terminal identifier.

BRIEF DESCRIPTION OF THE DRAWINGS

The above and other objects, features, advantages and technical and industrial significance of the present invention will be better understood by reading the following detailed description of the preferred embodiment of the invention, when considered in connection with the accompanying drawings, in which:

FIGS. 4A and 4B are views each illustrating an example of information stored in a data storage area: FIG. 4A is a view illustrating the information in a state before a login processing is performed; and FIG. 4B is a view illustrating the information in a state after the login processing was performed;

FIG. 5A illustrates a menu screen; and FIG. 5B illustrates a proximity instruction screen;

FIGS. 6A and 6B are views each illustrating an example of a screen displayed on the display of the mobile terminal: FIG. 6A illustrates a lock-orientation instruction screen; and FIG. 6B illustrates an unlock-orientation instruction screen;

FIG. 7A illustrates a login screen; FIG. 7B illustrates a lock-orientation registration screen; and FIG. 7C illustrates an unlock-orientation registration screen;

DETAILED DESCRIPTION OF THE PREFERRED EMBODIMENT

Hereinafter, there will be described a preferred embodiment of the invention with reference to the drawings. The present invention is not limited to the illustrated embodiment. It is to be understood that the present invention may be embodied with, various changes and modifications that may occur to a person skilled in the art, without departing from the spirit and scope of the invention defined in the appended claims.

<Embodiment>

Figure 1:
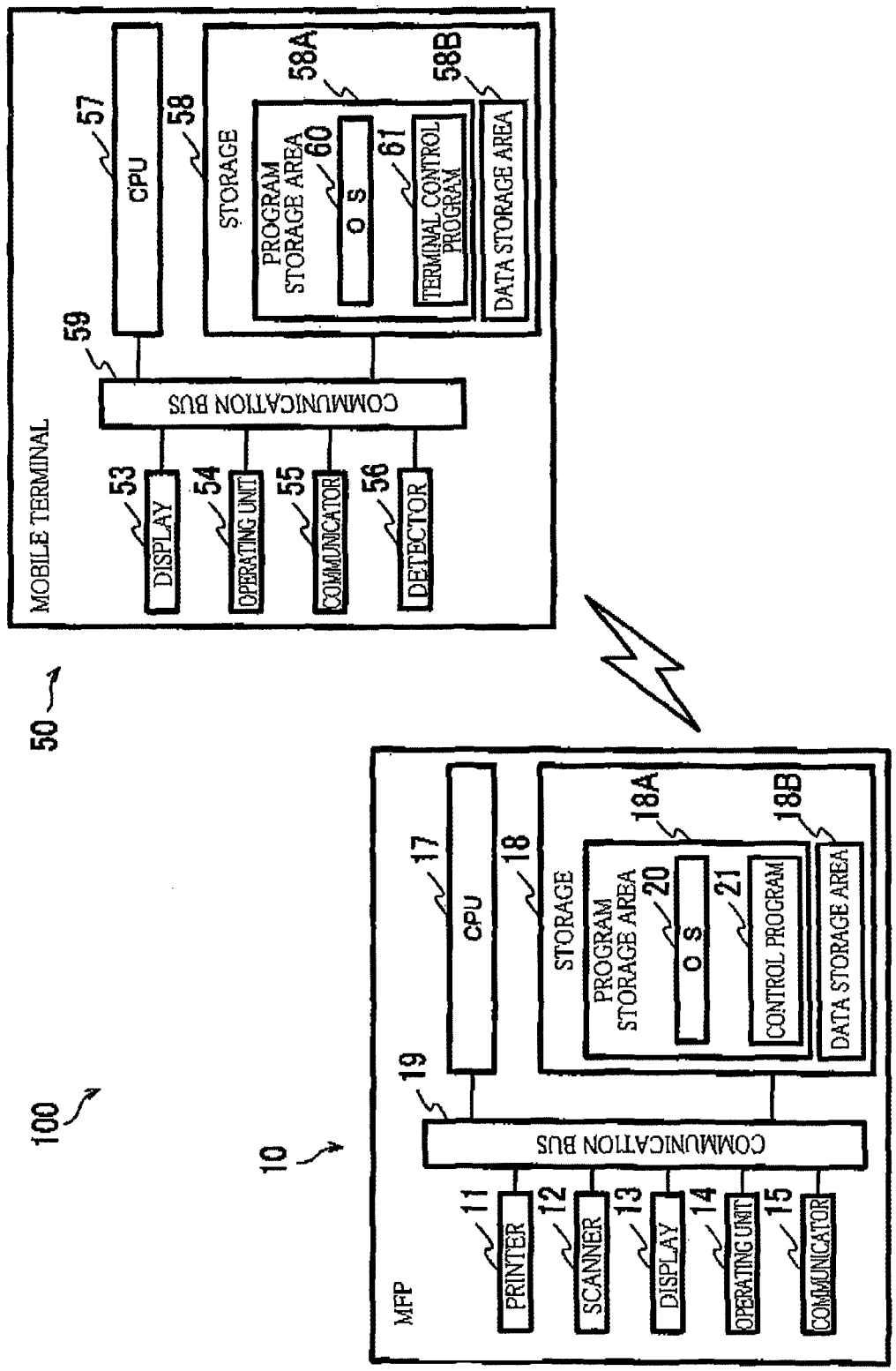
FIG. 1 is a schematic view of an image processing system according to an embodiment of the present invention.

FIG. 1 schematically illustrates an image processing system 100 in the present embodiment. The image processing system 100 illustrated in FIG. 1 is constituted by a Multi Function Peripheral (hereinafter, referred to as "MFP") 10 and a mobile terminal 50. The MFP 10 and the mobile terminal 50 are configured to be communicable with each other in a procedure conforming to the standard of NFC (abbreviation of "Near Field Communication"). The NFC standard in the present embodiment is ISO/IEC 21481 standard or ISO/IEC 18092 standard. The NEC communication is wireless communication using electric waves of bandwidth of 13.56 MHz. The MFP 10 and the mobile terminal 50 may be communicable with each other by using communication network different from the NFC. Further, the MFP 10 and the mobile terminal 50 may be communicable with each other by wire communication or by wireless communication.

<MFP 10>

As illustrated in FIG. 1, the MFP 10 mainly includes a printer 11, a scanner 12, a display 13, an operating unit 14, a communicator 15, a CPU 17, a storage 18, and a communication bus 19. Devices and components of the MFP 10 are connected to each other through the communication bus 19. The MFP 10 is an example of an image processing apparatus.

Figure 2:
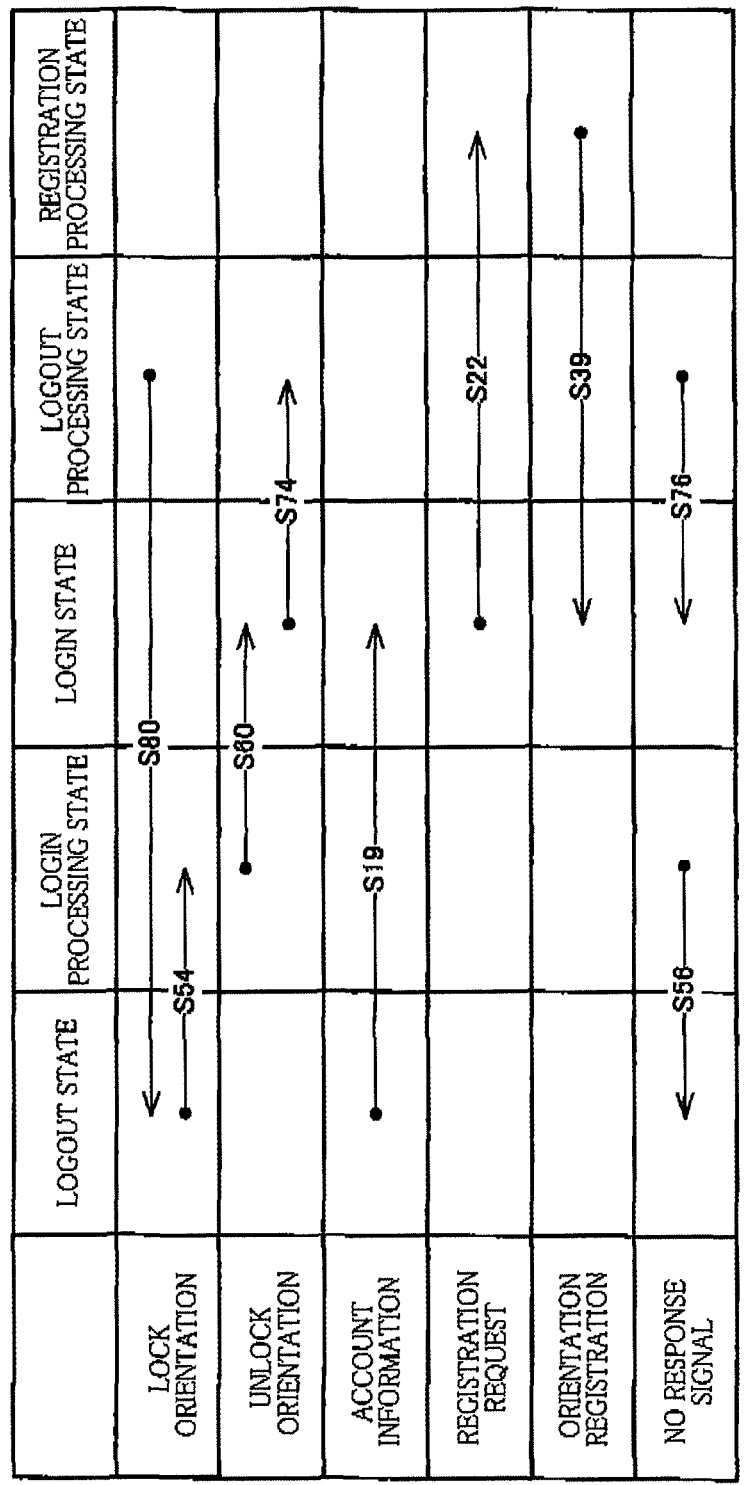
FIG. 2 is a table illustrating transition of a state of a Multi Function Peripheral (MFP) in the embodiment.

As illustrated in FIG. 2, the MFP 10 is capable of switching a state thereof among a logout state, a login processing state, a login state, a logout processing state, and a registration processing state. The login state is an example of a first state, and the logout state is an example of a second state. Further, the login processing state is a state in which login processing described later is under execution, the logout processing state is a state in which logout processing described later is under execution, and the registration processing state is a state in which registration processing described later is under execution. The switching of the state of the MFP 10 will be described in detail later.

The printer 11 performs print processing using a well-known method such as an inkjet method or an electrophotographic method. In the print processing, an image indicated by image data is recorded on a recording medium. The scanner 12 performs scan processing in which the scanner 12 reads an image recorded on an original document so as to generate image data. Each of the printer 11 and the scanner 12 is an example of a processing unit which performs processing to image data. The MFP 10 may further perform copy processing in which an image indicated by image data generated in the scanner 12 is recorded on the recording medium in the printer 11 or facsimile processing in which facsimile transmission is performed.

The MFP 10 in the logout state, compared with the MFP 10 in the login state, restricts processing executable in the printer 11 and the scanner 12. For example, the printer 11 may be restricted to perform color printing in the logout state and permitted to perform the color printing in the login state. Furthermore, for example, the scanner 12 may be restricted to perform high-image-quality scanning in the logout state and permitted to perform the high-image-quality scanning in the login state. However, processing that is restricted in the logout state is not limited to the above-described examples.

<Display 13>

The display 13 includes a display screen for displaying various kinds of information. A specific structure of the display 13 is not limited to a particular one, and for example, an LCD (Liquid Crystal Display), an OELD (Organic Electro-Luminescence Display), and so on may be adopted as the display 13.

<Operating unit 14>

The operating unit 14 receives input of a symbol string in an input area that is displayed on the display screen of the display 13, and detects user's operation to select one of objects that are displayed on the display screen of the display 13. Specifically, the operating unit 14 includes, for example, a push button or a plurality of push buttons, and outputs various kinds of operating signals corresponding to pushed push buttons. Furthermore, the operating unit 14 may include a touch sensor which has a film structure and is superposed on the display screen. In other words, the display 13 may be configured as a touch panel display. As the touch sensor, a well-known type such as an electrostatic capacity type or a resistance film type may be adopted.

The above-mentioned "objects" indicate images that are selectable by the user's operation of the operating unit 14. As one example, the objects may be character strings displayed on the display 13, and a direction key of the operating unit 14 may be pushed down such that one of the objects is highlighted, and then, a determination button may be pushed down such that the one of the objects that is being highlighted is selected. As another example, in a case where the operating unit 14 is a touch panel, the objects are icons, buttons, links and so forth that are displayed on the display 13, and the object that is displayed at a touch position may be selected. Further, the symbol string is constituted by characters (e.g., the Kana (the Japanese syllabary) character, the Chinese character, the English alphabet, and so on), numbers, marks, and so forth. For example, the symbol string indicates a user ID and a password that will be described later, and so on.

<Communicator 15>

The communicator 15 is an interface for communicating with an external device in a procedure conforming to the NFC standard. The communicator 15 includes an IC chip having a storage for receiving and transmitting of various kinds of information and various kinds of instructions (hereinafter, generally referred to as "information and so forth"). For example, the MFP 10 causes the communicator 15 to transmit the information and so forth and polling signals to the mobile terminal 50 and receives various kinds of information from the mobile terminal 50 through the communicator 15.

<CPU 17>

The CPU (Central Processing Unit) 17 controls overall operations of the MFP 10. The CPU 17, based on operation signals output from the operating unit 14 and various kinds of information and so on which the communicator 15 has received from the mobile terminal 50, receives various kinds of programs described later from the storage 18 and executes the various kinds of programs. In other words, the CPU 17 and the storage 18 constitute an example of a controller.

<Storage 18>

The storage 18 includes a program storage area 18A and a data storage area 18B. In the program storage area 18A, an OS (Operating System) 20 and a control program 21 are stored. The control program 21 may be a single program or may be a group of a plurality of programs. In the data storage area 18B, data or information necessary for execution of the control program 21 are stored.

In the present specification, the "data" and the "information" are common in terms that each of the data and the information is a bit or a bit string that a computer is capable of dealing with. The "data" is an object which a computer is capable of handling without considering details indicated by each bit. The "information" is an object which causes branching in an operation of a computer depending on details indicated by each bit. Moreover, the "instruction" is a control signal for demanding next operation to a device to which the instruction is transmitted, and may include the information or may have a nature of the information itself.

Further, even if the "data" and the "information" are changed in format (for example, a text format, a binary format, a flag format, and so on) for each computer, as long as it is recognized that details of the data and the information are identical, the data and the information are handled as the identical data and the identical information. For example, the information indicating "two" may be held in one computer as the information in a text format of "0x32" in the ASCII code, and may be held in another computer as the information in a binary format of "10" in the binary notation.

The "data" and the "information" are not strictly distinguished, and are permitted to be exceptionally handled. For example, the data may be temporarily used as the information, or the information may be temporarily used as the data. Further, while one is used as the data in one apparatus, the one may be used as the information in another apparatus. Furthermore, the information may be taken out among the data, or the data may be taken out among the information.

The storage 18 is, for example, constituted by a RAM (Random Access Memory), a ROM (Read Only Memory), an EEPROM (Electrically Erasable Programmable Read-Only Memory), an HDD (Hard Disk Drive), a buffer for the CPU 17, and so on or constituted by a combination of at least two of the above-mentioned elements. The storage 18 may be a storage medium that is readable by a computer. The storage medium that is readable by a computer is a non-transitory medium. The non-transitory medium includes, in addition to the above-mentioned example, a storage medium such as a CD-ROM, a DVD-ROM, and so on. On the other hand, the non-transitory medium does not include electrical signals for transmitting programs that are downloaded from a server on the Internet, and the like.

Programs stored in the program storage area 18A are executed by the CPU 17. However, in the present specification, operation of each of the programs may be described without referring to the CPU 17. In other words, the description meaning that "a program A executes processing A" may indicate that "the CPU 17 executes the processing A written in the program A". This applies to the mobile terminal 50 described later.

The OS 20 is a basic program which provides API (Application Programming Interface) for controlling hardware constituting the MFP 10 such as the printer 11, the scanner 12, the display 13, the operating unit 14, the communicator 15, and so forth. In other words, each of the above-mentioned programs calls the API that the OS 20 provides so as to control each hardware. However, in the present specification, operation of each of the programs will be described without referring to the OS 20. In other words, the description described later meaning that "program B controls hardware C" may indicate that "the program B controls the hardware C through the API of the OS 20". This applies to the mobile terminal 50 described later.

<Mobile Terminal 50>

As illustrated in FIG. 1, the mobile terminal 50 mainly includes a display 53, an operating unit 54, a communicator 55, a detector 56, a CPU 57, a storage 58, and, a communication bus 59. Further, as illustrated in FIG. 6, the mobile terminal 50 includes a housing 51. The display 53, the operating unit 54, the communicator 55, the CPU 57, the storage 58, and the communication bus 59 that are included in the mobile terminal 50 are similar in function to the display 13, the operating unit 14, the communicator 15, the CPU 17, the storage 18 and the communication bus 19, so that the description thereof will be omitted. However, an OS (Operating System) 60 and a terminal control program 61 are stored in the program storage area 58A of the storage 58. Further, various kinds of information explained later, such as a terminal identifier, a registration flag, lock orientation information, and unlock orientation information, is written into an IC chip of the communicator 55.

<Housing 51>

The housing 51 has a flat box shape in which a dimension in a front-rear direction of the housing 51 is smaller than dimensions in an up-down direction thereof and in a left-right direction thereof. More specifically, as illustrated in FIG. 6A, in a plan view seen from a front side, the housing 51 has a rectangular shape constituted by an upper side 51A and a lower side 51B that extend in generally parallel with the left-right direction, and by a left side 51C and a right side 51D that extend in generally parallel with the up-down direction. Each of components of the mobile terminal 50 illustrated in FIG. 1 is disposed on a surface of the homing 51 or inside the housing 51. For example, the display 53 is disposed on a front surface of the housing 51. The mobile terminal 50 has a size enough to be portable by one hand or both hands of the user, and, typically, the mobile terminal 50 is a mobile phone or a tablet computer.

<Detector 56>

The detector 56 detects an orientation of the housing 51 and outputs orientation information indicating the detected orientation of the housing 51 to the CPU 57. More specifically, as illustrated in FIG. 6A, the detector 56 detects an inclination of the housing 51 with respect to a virtual plane including a display screen of the display 53, with reference to an orientation of the housing 51 in which the upper side 51A of the housing 51 is positioned above the lower side 51B thereof and that the upper side 51A and the lower side 51B thereof extend in parallel with a horizontal direction. A detail of the orientation information is not particularly limited. For example, a rotation angle of the housing 51 being in an orientation in which the upper side 51A is positioned above the lower side 51B and the upper side 51A and the lower side 51B extend in parallel with the horizontal direction may be determined to be 0°, and a rotation angle of the housing 51 in a clockwise direction may be indicated by 0° through 360°. The detector 56 may be any kind of detector or sensor and may be a gyro sensor, for example.

<Communication Between MFP 10 and Mobile Terminal 50>

In the present specification, a device that is communicable in a procedure that meets the NFC standard will be referred to as a "NFC device". That is, each of the MFP 10 and the mobile terminal 50 is an example of the NFC device. The NFC device operates in either one of a P2P mode, a Reader mode, a Writer mode, and a CE mode. Further, in the present specification, the Reader mode and the Writer mode may be referred together to as an "R/W mode".

The P2P mode is a mode for performing a bidirectional (two-way) communication between a pair of NFC devices. The NFC device of Type A that is provided by ISO/IEC 14443 established by the NFC forum, and the NFC device of Type F that is provided by ISO/IEC 18092 are capable of operating in the P2P mode. On the other hand, the NFC device of Type B that is provided by ISO/EEC 14443 is not capable of operating in the P2P mode.

The R/W mode and the CE mode is a mode for performing a unidirectional (one-way) communication between a pair of NFC devices. The CE mode is a mode in which the NPC device operates as a "card" that is a form established by the NFC forum. The NFC devices of Type A, Type F, and Type B are capable of operating in the CE mode. The Reader mode is a mode for reading the information and so forth from the NFC device that is operating in the CE mode. The Writer mode is a mode for writing various kinds of information in the NFC device that is operating in the CE mode.

In the present embodiment, there will be mainly described an example in which the MFP 10 operates in the Reader mode and the mobile terminal 50 operates in the CE mode. In other words, the MFP 10 which operates in the Reader mode is capable of reading the information and so forth from the mobile terminal 50 which operates in the CE mode. However, the present invention is not limited to this example. For example, the MFP 10 and the mobile terminal 50 may operate in the P2P mode.

The communicator 15 of the MPP 10 in the present embodiment performs a polling operation in which the communicator 15 transmits a polling signal at predetermined time intervals and monitors a response signal that is a response to the polling signal. The communicator 15 having received the response signal instructs the CPU 17 to execute the following processing. On the other hand, the communicator 55 of the mobile terminal 50 in the present embodiment performs a Listening operation. The Listening operation is an operation in which the communicator 15 monitors the polling signal transmitted from the MFP 10 and transmits a response signal under a condition of receiving of the polling signal. The communicator 55 having transmitted the response signal instructs the CPU 57 to execute the following processing.

Then, the CPU 17 of the MFP 10 causes the communicator 15 to receive information indicating in which mode the mobile terminal 50 is operable. Based on the information received from the mobile terminal 50, the CPU 17 determines respective modes of the MFP 10 and the mobile terminal 50 to be operated, and the CPU 17 then causes the communicator 15 to transmit to the mobile terminal 50 an Activation command indicating the operation mode of the mobile terminal determined by the CPU 17. On the other hand, the CPU 57 of the mobile terminal 50, on condition that the communicator 55 has received the Activation command transmitted from the MFP 10, causes the communicator 55 to transmit to the MFP 10 an OK command that is a response to the Activation command. Consequently, a communication link of the NFC type is established (connected) between the MFP 10 and the mobile terminal 50. Thereafter, the MFP 10 and the mobile terminal 50 transmit and receive the information and so forth through the communication link.

Then, the CPU 17 of the MFP 10, when the communication with the mobile terminal is finished, causes the communicator 15 to transmit a Deactivation command for disconnecting the communication link to the mobile terminal 50. On the other hand, the CPU 57 of the mobile terminal 50, on condition that the communicator 55 has received the Deactivation command transmitted from the MFP 10, causes the communicator 55 to transmit an OK command that is a response to the Deactivation command to the MFP 10. Consequently, the communication link between the MFP 10 and the mobile terminal 50 is disconnected.

<Registration Processing>

Figure 3:
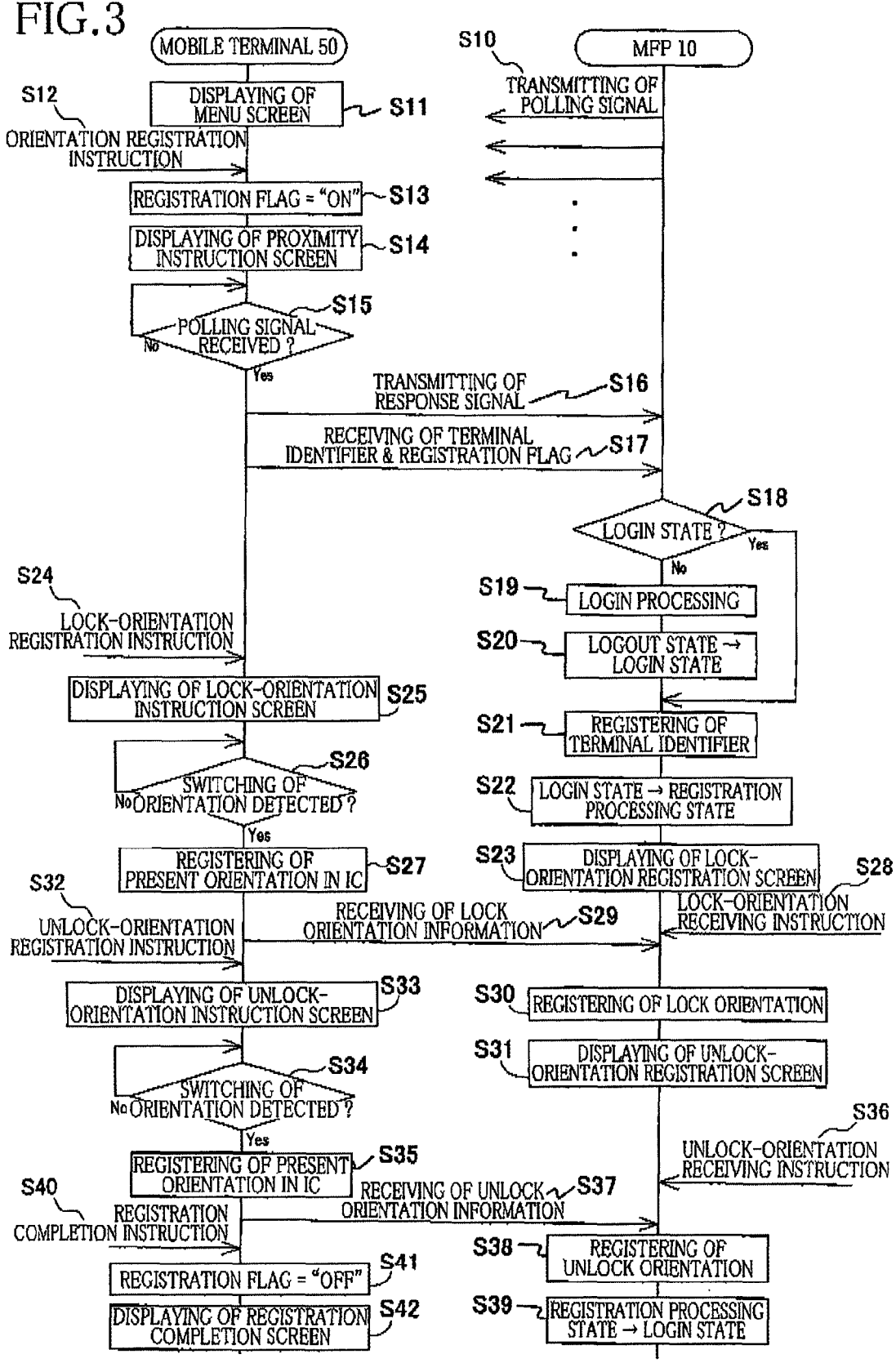
FIG. 3 is a sequence diagram of a registration processing in the embodiment.

Hereinafter, the registration processing in the present embodiment will be described with reference to FIGS. 3 through 7. The registration processing illustrated in FIG. 3 is processing in which the terminal identifier, the lock orientation information, the unlock orientation information received from the mobile terminal 50 are stored in the data storage area 18B in association with the account information. FIG. 4A illustrates an example of information stored in the data storage area 18B of the MFP 10 at a start point in time of the registration processing in the present embodiment.

The word "No" in FIG. 4A is information for uniquely identifying (distinguishing) a set of pieces of information corresponding to each other, and is assigned by the MFP 10 when the account information is registered. The account information is information for switching the printer 11 and the scanner 12 from the logout state to the login state. For example, the account information is constituted by a combination of the user ID and the password. However, for simplification, in FIG. 4A, the account information is illustrated as "user A", "user B", "user C", and so on. In the present embodiment, the account information has been previously stored in the data storage area 18B prior to a time when the registration processing is executed.

The "terminal identifier" is information for uniquely identifying the mobile terminal 50. In FIG. 4A, a MAC (Media Access Control) address that is assigned to the communicator 55 is used as an example of the terminal identifier, but the terminal identifier is not limited to the MAC address. Examples of the terminal identifier include a telephone number assigned to the mobile terminal 50, and a SIM-ID assigned to a SIM (Subscriber Identity Module) card inserted in the mobile terminal 50.

The "lock orientation information" is information indicating a lock orientation of the mobile terminal 50. The "unlock orientation information" is information indicating an unlock orientation of the mobile terminal 50 that is different from the lock orientation. As illustrated in FIG. 4A, the lock orientation and the unlock orientation may be determined differently according to the users. In other words, the user of the mobile terminal 50 is allowed to register any orientation as each of the lock orientation and the unlock orientation in the registration processing illustrated in FIG. 3. Further, as in the case of the user C in FIG. 4A, the account information may exist without being assigned with the terminal identifier, the lock orientation information, and the unlock orientation information. The lock orientation is an example of a first orientation, the lock orientation information is an example of a first orientation information, the unlock orientation is an example of a second orientation, and the unlock orientation information is an example of a second orientation information.

Details of the lock orientation information and the unlock orientation information are not particularly limited, but, for example, each of the lock orientation information and the unlock orientation information may be orientation information output from the detector 56. In the lock orientation corresponding to the user A in FIG. 4A, as illustrated in FIG. 6A, the angle of 0° is registered, as the lock orientation information, for the rotation angle of the housing 51 being in the orientation in which the upper side 51A is positioned above the lower side 51B, and the upper side 51A and the lower side 51B extend in parallel with the horizontal direction. Further, in the unlock orientation corresponding to the user A in FIG. 4A, as illustrated in FIG. 6B, the angle of 90° is registered, as the unlock orientation information, for the rotation angle of the housing 51 being in the orientation in which the left side 51C is positioned above the right side 51D, and the left side 51C and the right side 51D extend in parallel with the horizontal direction.

The term "executable processing" indicates processing which is executable in the printer 11 in a case where the login state of the MFP 10 is established using the account information corresponding to the processing. In other words, the executable processing executable in the printer 11 being in the login state may be different according to the account information. In an example illustrated in FIG. 4A, a color printing and a double-side printing are allowed for the printer 11 whose login state is established with the account information of the user A. A color printing is allowed for the printer 11 whose login state is established with the account information of the user B. A photo printing is allowed for the printer 11 whose login state is established with the account information of the user C. Though illustration is omitted, the executable processing in the scanner 12 may be similarly set according to the account information.

Figure 5B:
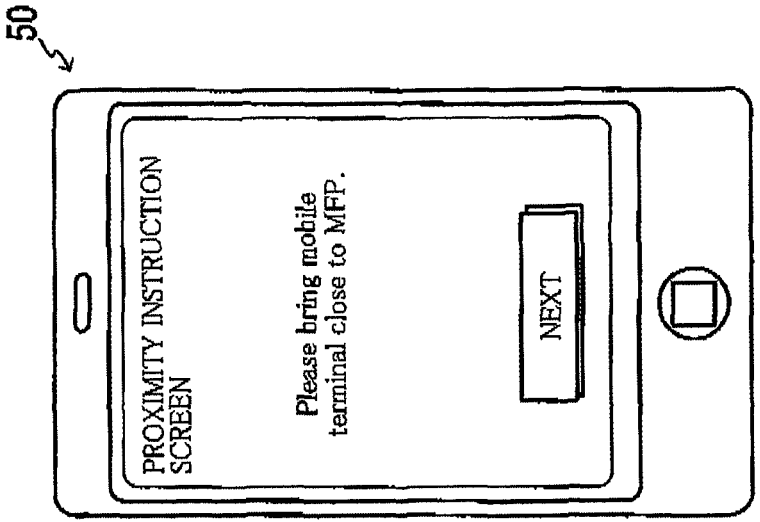
FIGS. 5A and 5B are views each illustrating an example of a screen displayed on a display of a mobile terminal.
Figure 5A:
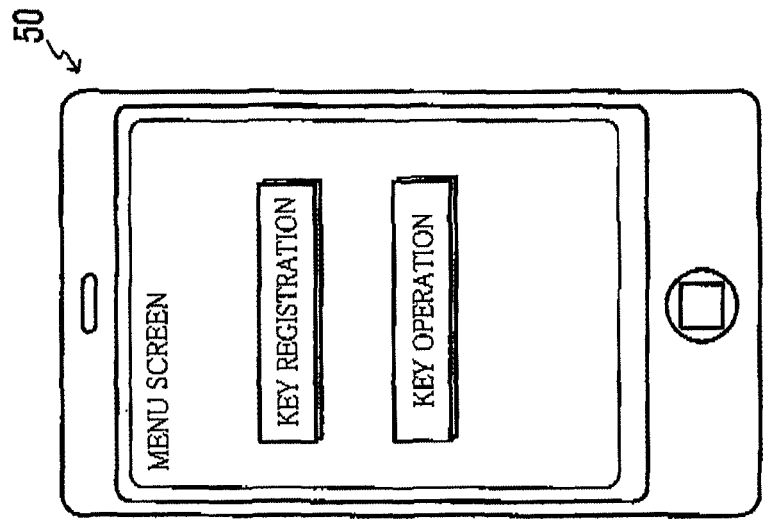

The registration processing will be described with reference to FIG. 3. The communicator 15 of the MFP 10 repeatedly transmits the polling signal at predetermined time intervals (S10). The predetermined time interval is, for example, about 400 msec. When operation of start of the terminal control program 61 is detected by the detector 54, the CPU 57 of the mobile terminal 50 causes the display 53 to display a menu screen (S11). FIG. 5A is an example of the menu screen. On the menu screen illustrated in FIG. 5A, a "Key Registration" button and a "Key Operation" button are displayed.

Then, for example, when the operating unit 54 detects an operation of tapping the "Key Registration" button (S12), the terminal control program 61 causes the terminal identifier to be stored into the IC chip of the communicator 55, and sets the registration flag included in the IC chip to "ON" (S13). The tapping of the "Key Registration" button is an example of input of an orientation registration instruction. The registration flag is information for transmitting to the MFP 10 whether the registration processing is to be executed. When the registration processing is to be executed, the registration flag is set to "ON", and when the login processing and the logout processing that will be described later are to be executed, the registration flag is set to "OFF".

The terminal control program 61 then causes the display 53 to display a proximity instruction screen (814). FIG. 5B is an example of the proximity instruction screen. The proximity instruction screen illustrated in FIG. 5B includes: a message for prompting a user to move the mobile terminal 50 to a position at which the mobile terminal 50 can receive the polling signal transmitted from the MFP 10; and a "Next" button. The position at which the mobile terminal 50 can receive the polling signal is, for example, inside a sphere having approximately a radius of 10 cm centered around the MFP 10. The radius of 10 cm is an example of a threshold range.

Subsequently, when the polling signal transmitted from the MFP 10 is received by the communicator 55 of the mobile terminal 50 (S15: Yes), the communicator 55 transmits the response signal (S16). On the other hand, when the response signal transmitted from the mobile terminal 50 is received by the communicator 15 (S16), the control program 21 of the MFP 10 establishes the communication link between the MFP 10 and the mobile terminal 50, receives the terminal identifier and the registration flag from the mobile terminal 50 through the communication link (S17), and then disconnects the communication link. In the present embodiment, the MFP 10 receives the terminal identifier "38: 2B: 41: 8E: 07: 9C" and the registration flag "ON".

That the MFP 10 operating in the Reader mode receives information from the mobile terminal 50 operating in the CE mode may indicate, for example, that the MFP 10 reads the information written in the IC chip included in the communicator 55 of the mobile terminal 50. On the other hand, that the MFP 10 operating in the P2P mode receives information from the mobile terminal 50 operating in the P2P mode may indicate, for example, that the MFP 10 receives the information transmitted from the mobile terminal 50 through the communication link. Further, the MFP 10 may perform establishment (connection) processing of the communication link and disconnection processing of the communication link every time the MFP 10 receives information, and the MFP 10 may receive a plurality of pieces of information from a time point when the communication link is established to a time point when the communication link is disconnected. The establishment processing of the communication link and the disconnection processing of the communication link have been described above and will not be explained again. This applies to steps described later.

Then, when the registration flag received in S17 is "ON", the control program 21 of the MFP 10 determines whether the MFP 10 is in the login state (S18). When the MFP 10 is in the logout state (S18: No), the control program 21 then performs the login processing (S19). On the other hand, when the MFP 10 has already been in the login state (S18: Yes), the control programs 21 skips processing of S19, S20.

Figure 7A:
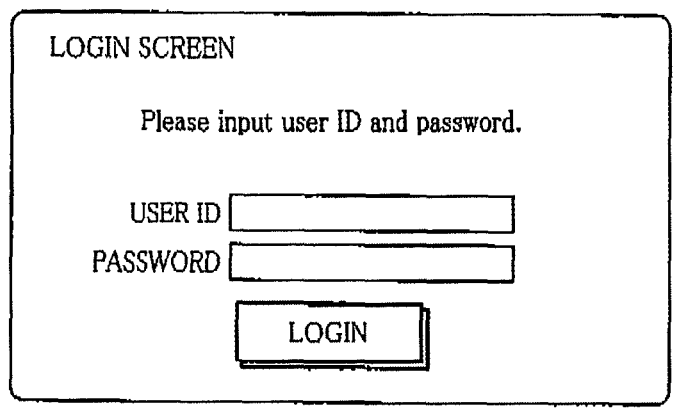
FIGS. 7A through 7C are views each illustrating an example of a screen displayed on the display of the MFP.

In the login processing in S19, the control program 21 causes the display 13 to display a login screen. FIG. 7A is an example of the login screen. The login screen illustrated in FIG. 7A includes a text box for receiving input of the user ID, a text box for receiving input of the password, and a "Login" button. When the operating unit 14 detects the operation of tapping of the "Login" button on the login screen, the control program 21 compares a combination of the user ID and the password having been input in the text boxes of the login screen (hereinafter, referred to as "input account information") with the account information having been stored in the data storage area 18B (hereinafter, referred to as "registered account information").

When the input account information is identical with the registered account information, the control program 21 switches a state of the MFP 10 from the logout state to the login state using the account information (S20).

In the present embodiment, the login processing is performed using the account information of the user C. The control program 21 causes the CPU. 17 to store the terminal identifier received in S17, into the data storage area 18B such that the terminal identifier is associated with the account information used for switching the MFP 10 to the login state (S21). In other words, in the above-mentioned example, the control program 21 causes the CPU 17 to store the terminal identifier "38: 2B: 41: 8E: 07: 9C" received in S17, into the data storage area 18B such that the terminal identifier is associated with the account information of the user C.

Figure 7B:
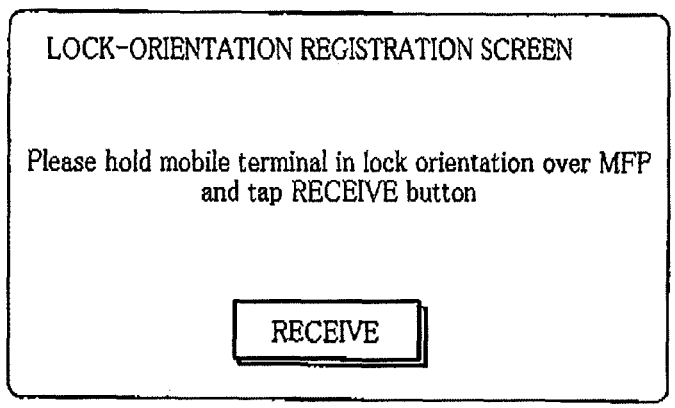

Then, the control program 21 switches the state of the MFP 10 from the login state to the registration processing state (S22). Then, the control program 21 causes the display 13 to display a lock-orientation registration screen (S23). FIG. 7B is an example of the lock-orientation registration screen. The lock-orientation registration screen illustrated in FIG. 7B includes: a message for prompting the user to hold the mobile terminal 50 in the lock orientation; and an "Receive" button.

On the other hand, when the operating unit 54 detects the operation of tapping of the "Next" button on the proximity instruction screen (S24), the terminal control program 61 of the mobile terminal 50 causes the display 53 to display a lock-orientation instruction screen (825). The tapping of the "Next" button on the proximity instruction screen is an example of input of a lock-orientation registration instruction. FIG. 6A is an example of the lock-orientation instruction screen. The lock-orientation instruction screen illustrated in FIG. 6A includes: a message for prompting the user to hold the mobile terminal 50 in the lock orientation; and a "Next" button.

When the detector 56 detects switching of the orientation of the housing 51 (S26: Yes), the terminal control program 61 writes the orientation information indicating a present orientation of the housing 51 in the IC chip of the communicator 55 (S27). For example, in a case where the housing 51 takes an orientation illustrated in FIG. 6A, the angle 0° is written as the orientation information in the IC chip of the communicator 55. The processing of S26 and S27 is not always executed in this timing, but may be executed whenever switching of the orientation of the housing 51 is detected during the power of the mobile terminal 50 is on or during execution of the registration processing, the login processing, and the logout processing. This applies to S34 and S35 described later. Moreover, S18 through S23 to be executed in the MFP 10 and S24 through S27 to be executed in the mobile terminal 50 may be concurrently executed.

Next, when the operating unit 14 detects the operation of tapping the "Receive" button on the lock-orientation registration screen (S28), the control program 21 of the MFP 10 receives the orientation information having been stored in the IC chip of the mobile terminal 50 as the lock orientation information (S29). That is, an orientation of the housing 51 in timing when the "Receive" button on the lock-orientation registration screen is tapped is the lock orientation. The tapping of the "Receive" button on the lock-orientation registration screen is an example of input of a lock-orientation receiving instruction. The control program 21 then causes the CPU 17 to store the lock orientation information received in S29 into the data storage area 18B such that the lock orientation information is associated with the account information used in the login processing in S19 (S30). In the above-mentioned example, the angle 0° received in S29 is stored as the lock orientation information in the data storage area 18B in association with the account information of the user C.

Figure 7C:
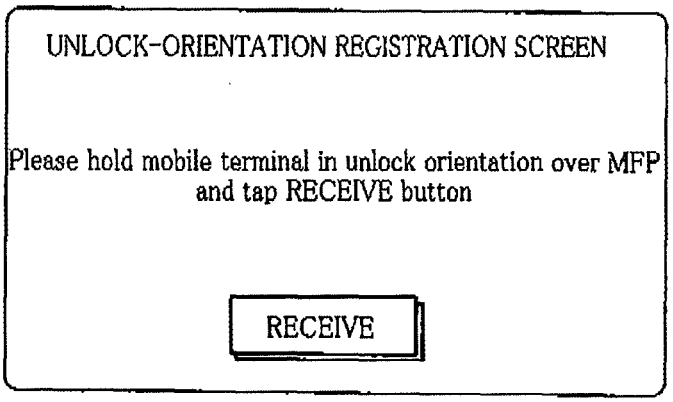

Then, the control program 21 causes the display 13 to display an unlock-orientation registration screen (S31). FIG. 7C is an example of the unlock-orientation registration screen. The unlock-orientation registration screen illustrated in FIG. 7C includes: a message for prompting the user to hold the mobile terminal 50 in the unlock orientation; and an "Receive" button.

On the other hand, when the operating unit 54 detects an operation of tapping of the "Next" button on the lock-orientation instruction screen (S32), the terminal control program 61 of the mobile terminal 50 causes the display 53 to display an unlock-orientation instruction screen. The operation of S32 needs to be executed after S28. The operation of tapping of the "Next" button on the lock-orientation instruction screen is an example of an unlock-orientation registration instruction. Further, FIG. 6B is an example of the unlock-orientation instruction screen. The unlock-orientation instruction screen illustrated in FIG. 6B includes: a message for prompting the user to hold the mobile terminal 50 in the unlock orientation; and a "Next" button.

When the detector 56 detects switching of an orientation of the housing 51 (S34: Yes), the terminal control program 61 writes orientation information indicating a present orientation of the housing 51 in the IC chip of the communicator 55 (S35). For example, in a case where the housing 51 takes an orientation illustrated in FIG. 6B, the angle 90° is written as the orientation information in the IC chip of the communicator 55. Processing of S30 and S31 to be executed in the MFP 10 and processing of S32 through S35 to be executed in the mobile terminal 50 may be concurrently executed.

Then, when the operating unit 14 detects an operation of tapping of the "Receive" button on the unlock-orientation registration screen (S36), the control program 21 of the MFP 10 receives the orientation information stored in the IC chip of the mobile terminal 50 as the unlock orientation information (S37). In other words, an orientation of the housing 51 in timing when the "Receive" button on the unlock-orientation registration screen is tapped is the unlock orientation. The tapping of the "Receive" button on the unlock-orientation registration screen is an example of input of an unlock-orientation receiving instruction.

Next, the control program 21 causes the CPU 17 to store the unlock orientation information received in S37, into the data storage area 18B such that the unlock orientation information is associated with the account information used in the login processing in S19 (S38). In the above-described example, the angle 90° received in S37 is stored as the unlock orientation information in the data storage area 18B in association with the account information of the user C. Further, the control program 21 switches a state of the MFP 10 from the registration processing state to the login state (S39).

On the other hand, when the operating unit 54 detects an operation of tapping of the "Next" button on the unlock-orientation instruction screen (S40), the terminal control program 61 of the mobile terminal 50 sets the registration flag included in the IC chip of the communicator 55 to "OFF" (S41), and causes the display 53 to display a registration completion screen (not shown) to inform the user of completion of the registration processing (S42). Execution of S40 needs to be executed after execution of S36. The tapping of the "Next" button on the unlock-orientation instruction screen is an example of input of a registration completion instruction. As a result of the registration processing in the present embodiment, as illustrated in FIG. 4B, the data storage area 18B stores the terminal identifier "38: 2B: 41: 8E: 07: 9C", the lock orientation information "0°", and the unlock orientation information "90°" in association with the account information of the user C.

<Login Processing>

Figure 8:
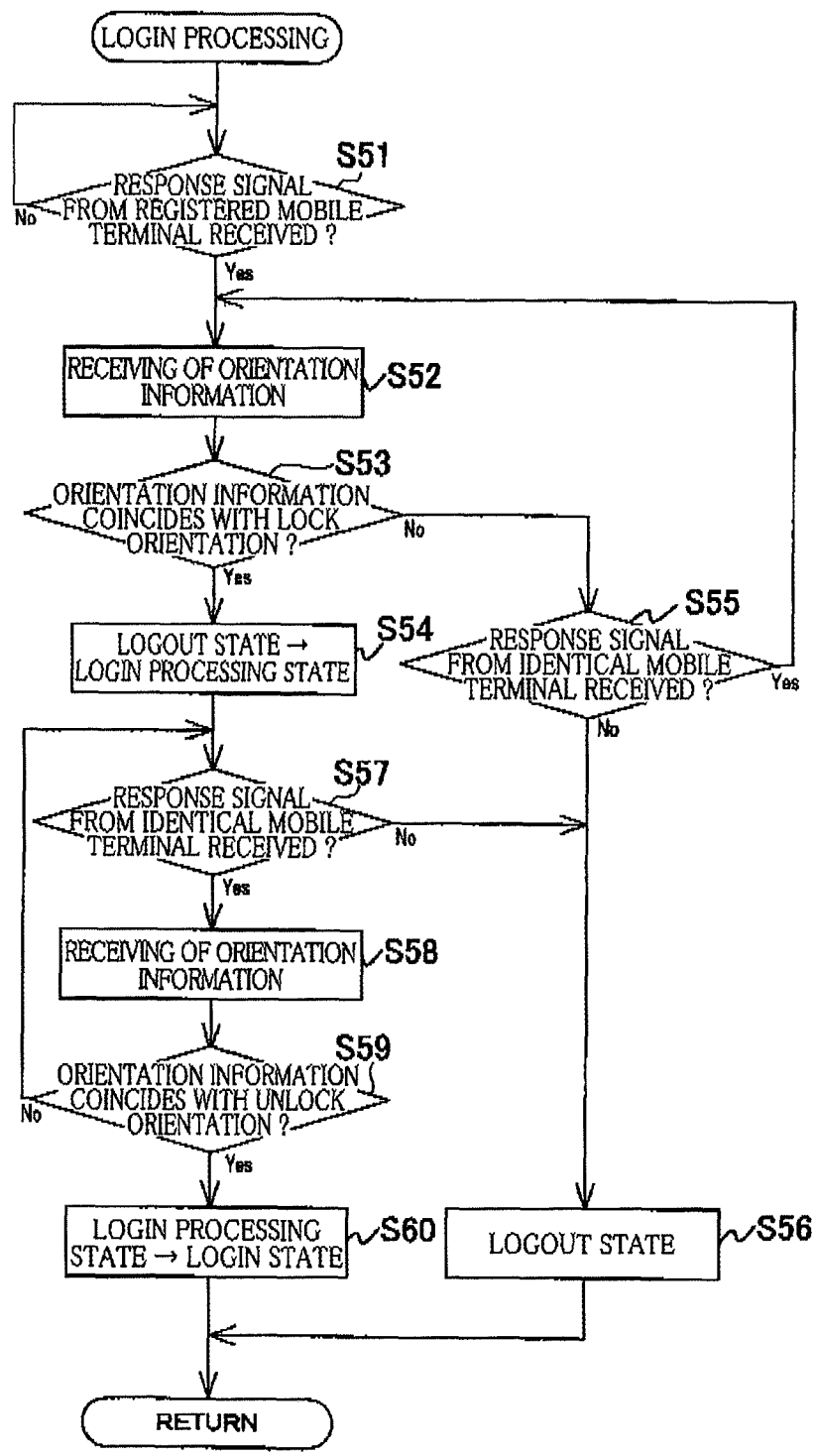
FIG. 8 is a flow chart illustrating the login processing in the embodiment.

Hereinafter, the login processing will be described with reference to FIG. 8. The login processing illustrated in FIG. 8 is processing in which an orientation of the mobile terminal 50 is switched in the vicinity of the MFP 10 from the lock orientation to the unlock orientation such that a state of the MFP 10 is switched from the logout state to the login state. At a start point in time of the login processing, the MFP 10 is in the logout state. Detailed description of the same processing as executed in the registration processing illustrated in FIG. 3 will be omitted.

The communicator 15 of the MFP 10, similarly in S10 in FIG. 3, repeatedly outputs the polling signal at predetermined time intervals. The control program 21 waits until the communicator 15 receives the response signal transmitted in response to the polling signal. On the other hand, for example, when the detector 56 detects an operation of tapping of the "Key Operation" button on the menu screen, the terminal control program 61 of the mobile terminal 50 writes in the IC chip of the communicator 55 the terminal identifier, the registration flag "OFF", the orientation information every time the detector 56 detects switching of the orientation of the housing 51. The mobile terminal 50, which the user brought close to the MFP 10, receives the polling signal and transmits the response signal to the MFP 10 in response to the polling signal.

Then, when the communicator 15 receives the response signal transmitted from the mobile terminal 50, the control program 21 of the MFP 10 receives the terminal identifier and the registration flag from the mobile terminal 50, and determines whether the received terminal identifier is identical with the terminal identifier stored in the date storage area 18 (S51). When the received terminal identifier is not stored in the data storage area 18B (S51: No), the control program 21 further waits until the communicator 15 receives the response signal from another mobile terminal 50. On the other hand, when the received terminal identifier is stored in the data storage area 18B and the registration flag is "OFF" (551: Yes), the control program 21 successively receives the orientation information from the mobile terminal 50 (S52).

Next, the control program 21 determines whether the lock orientation information stored in the data storage area 18B in association with the terminal identifier received in S51 is identical with the orientation information received in S52 (S53). When the lock orientation information stored in the data storage area 18B in association with the terminal identifier received in S51 is identical with the orientation information received in S52 (S53: Yes), the control program 21 switches a state of the MFP 10 from the logout state to the login processing state (S54). The mobile terminal 50 comes to be in the lock orientation in the vicinity of the MFP 10, so that the control program 21 in S52 can receive the orientation information that is identical with the lock orientation information associated with the terminal identifier.

On the other hand, when the lock orientation information stored in the data storage area 18B in association with the terminal identifier is not identical with the orientation information received in S52 (S53: No), the control program 21 determines whether the response signal is continuously received from the mobile terminal 50 from which the response signal has been received in S51 (S55). The CPU 17 of the MFP 10 which determines whether the response signal is received from the mobile terminal 50 in S55 is an example of a detector which detects an existence of the mobile terminal 50 within a predetermined distance from the MFP 10.

During reception of the response signal from the same mobile terminal 50 (S55: Yes), the control program 21 repeatedly executes the processing of S52, S53 and S55 until the control program 21 receives the orientation information identical with the lock orientation information associated with the terminal identifier (S53: Yes). On the other hand, when the communicator 15 is unable to receive the response signal from the same mobile terminal 50 (S55: No), the control program 21 causes the MFP 10 to be in the logout state (S56) and ends the login processing. A case where the response signal cannot be received from the mobile terminal 50 is, for example, a case where the user moves the mobile terminal 50 outside of an area in which the mobile terminal 50 can receive the polling signal from the MFP 10.

Then, the control program 21 after causing the MFP 10 to be in the login processing state (S54) determines whether the communicator 15 continues to receive the response signal from the mobile terminal 50 from which the response signal has been received in S51 (S57). When the communicator 15 continues to receive the response signal from the same mobile terminal 50 (S57: Yes), the control program 21 receives the orientation information from the mobile terminal 50 (S58). On the other hand, when the communicator 15 cannot receive the response signal from the same mobile terminal 50 (S57: No), the control program 21 causes the MFP 10 to be in the logout state (S56) and ends the login processing.

Then, the control program 21 repeatedly executes processing of S57 through S59 until the unlock orientation information, which has been stored in the data storage area 18B in association with the terminal identifier received in S51, coincides with the orientation information received in S58 (S59: Yes). The orientation of the mobile terminal 50 is switched from the lock orientation to the unlock orientation in the vicinity of the MFP 10, so that the control program 21 in S58 can receive the orientation information that is identical with the unlock orientation information associated with the terminal identifier. When the unlock orientation information stored in the data storage area 18B in association with the terminal identifier coincides with the orientation information received in S58 (S59: Yes), the control program 21 causes the state of the MFP 10 to switch from the login processing state to the login state using the account information stored in the data storage area 18B in association with the terminal identifier (S60) and ends the login processing.

<Logout Processing>

Figure 9:
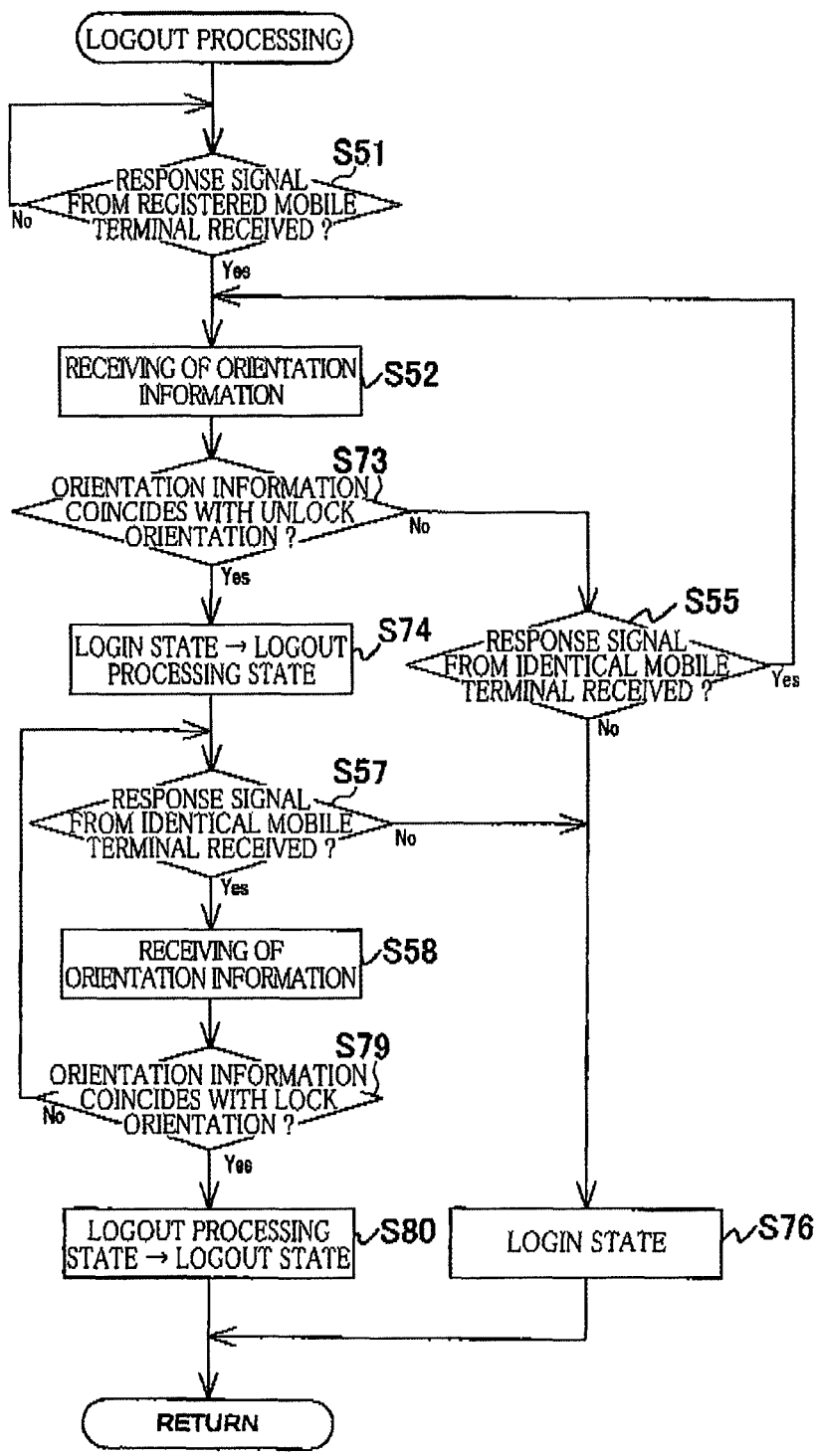
FIG. 9 is a flow chart illustrating a logout processing in the embodiment.

Hereinafter, the logout processing in the present embodiment will be described with reference to FIG. 9. The logout processing illustrated in FIG. 9 is processing in which the orientation of the mobile terminal 50 is switched from the unlock orientation to the lock orientation in the vicinity of the MFP 10 such that the state of the MFP 10 is switched from the login state to the logout state. At a start point in time of the logout processing, the MFP 10 is in the login state. In the logout processing, the same processing as executed in the login processing illustrated in FIG. 8 will be denoted by the identical step numbers used in the login processing and detailed description thereof will be omitted, and processing different from the login processing will be mainly described.

The control program 21 of the MFP 10 determines whether the unlock orientation information stored in the data storage area 18B in association with the terminal identifier received in S51 coincides with the orientation information received in S52 (S73). When the unlock orientation information stored in association with the terminal identifier coincides with the orientation information received in S52 (S73: Yes), the control program 21 causes the state of the MFP 10 to switch from the login state to the logout processing state (S74). The mobile terminal 50 comes to be in the unlock orientation in the vicinity of the MFP 10 such that the control program 21 in S52 can receive the orientation information that is identical with the unlock orientation information associated with the terminal identifier.

Further, the control program 21 of the MFP 10 determines whether the lock orientation information stored in the data storage area 18B in association with the terminal identifier received in S51 coincides with the orientation information received in S58 (S79). When the lock orientation information stored in association with the terminal identifier coincides with the orientation information received in S58 (S79: Yes), the control program 21 causes the state of the MFP 10 to switch from the logout processing state to the logout state (S80) and ends the logout processing. The orientation of the mobile terminal 50 is switched from the unlock orientation to the lock orientation in the vicinity of the MFP 10, so that the control program 21 in S58 can receive the orientation information that is identical with the lock orientation information associated with the terminal identifier.

On the other hand, when the communicator 15 cannot receive the response signal from the mobile terminal 50 from which the response signal has been received in S51 (S55: No/S57: No), the control program 21 causes the MFP 10 to be in the login state (S76) and ends the logout processing. Since other processing is similar to that in the login processing illustrated in FIG. 8, its description will be omitted.

<Effects>

In the present embodiment, the state of the MFP 10 can be switched by an intuitive operation of switching the orientation of the mobile terminal 50. More specifically, the orientation of the mobile terminal 50 is switched from the lock orientation to the unlock orientation in the vicinity of the MFP 10, so that the state of the MFP 10 is switched from the logout state to the login state. Further, the orientation of the mobile terminal 50 is switched from the unlock orientation to the lock orientation in the vicinity of the MFP 10, so that the state of the MFP 10 is switched from the login state to the logout state. Accordingly, the user does not need to input the user BD and the password especially every time the login processing is executed, so that operability of the MFP 10 can be enhanced without decrease in security.

In each of the login processing and the logout processing in the present embodiment, the control program 21 determines whether the orientation information stored in the data storage area 18B coincides with the orientation information received from the mobile terminal 50, but it is not necessary that the orientation information stored in the data storage area 18B completely coincides with the orientation information received from the mobile terminal 50. For example, in a case where the orientation information received from the mobile terminal 50 is within a predetermined range including the orientation information stored in the data storage area 18B, the control program 21 may determine that the orientation information stored in the data storage area 18B coincides with the orientation information received from the mobile terminal 50. The predetermined range is not particularly limited and may be within ±10° from the orientation information stored in the data storage area 18B.

Furthermore, in the login processing in the present embodiment, when the orientation information identical with the lock orientation associated with the terminal identifier is received (S53: Yes), the control program 21 switches the state of the MFP 10 (S54). When the orientation information identical with the unlock orientation associated with the terminal identifier is received (S59: Yes), the control program 21 switches the state of the MFP 10 (S60). However, in a case where each of the judgments in S53, S59 is performed once, the mobile terminal 50 is instantly switched from the lock orientation to the unlock orientation, so that unintended login processing may be performed. In order to address this problem, when the lock orientation of the mobile terminal 50 is received consecutively a threshold number of times, and the unlock orientation of the mobile terminal 50 is received consecutively a threshold number of times, the state of the MFP 10 may be switched from the logout state to the login state. The threshold number of times is not particularly limited and may be two or more.

Further, the MFP 10 and the mobile terminal 50 are communicable with each other in the procedure conforming to the standard of NFC. That is, in each of the login processing and the logout processing, the user needs to switch the orientation of the mobile terminal 50 in the vicinity of the MFP 10. This configuration reduces a possibility that the login processing or the logout processing is executed for the MFP 10 not intended by the user. The communication method between the MFP 10 and the mobile terminal 50 in each of the registration processing, the login processing and the logout processing is not limited to the NFC, and, for example, the MFP 10 and the mobile terminal 50 may communicate with each other through a wireless LAN (Local Area Network) or other similar methods.

Furthermore, in the registration processing in the present embodiment, the user can register any orientation as each of the lock orientation and the unlock orientation in the MFD 10. That is, the login processing and the logout processing using the mobile terminal 50 can be executed only by the user who knows the lock orientation and the unlock orientation registered in advance. As a result, even if the mobile terminal 50 is lost or stolen, this configuration can prevent specific processing from being executed by the user who has no authority to execute. Moreover, in the registration processing in the present embodiment, each of the lock orientation and the unlock orientation is registered in order in a dialogue style, so that each of the lock orientation and the unlock orientation can be easily and reliably registered.

In the registration processing in the present embodiment, the operation of tapping the "Next" button on each screen causes each of the lock-orientation registration instruction (S24), the unlock-orientation registration instruction (S32), and the registration completion instruction (S40) to be input to the mobile terminal 50, but the present invention is not limited to this. For example, each of the above-mentioned instructions may be input to the mobile terminal 50 by the MFP 10 operating in the R/W mode. This configuration eliminates a need for the user to tap each of the buttons displayed on the display 53 of the mobile terminal 50, resulting in further enhanced operability.

Specifically, for example, when the terminal identifier and the registration flag are received (S17), the control program 21 of the MFP 10 operating in the R/W mode may write the lock-orientation registration instruction in the IC chip of the communicator 55. Further, for example, when the lock orientation information is received (S29), the control program 21 of the MFP 10 operating in the R/W mode may write the unlock-orientation registration instruction in the IC chip of the communicator 55. Furthermore, for example, when the unlock orientation information is received (S37), the control program 21 of the MFP 10 operating in the R/W mode may write the registration completion instruction in the IC chip of the communicator 55.

In the present embodiment, the inclination of the housing 51 with respect to the vertical direction is used as the orientation information, but orientation information in the present invention is not limited to this. For example, the detector 56 may be a direction sensor and the orientation information may be information indicating a direction or an orientation of the housing 51. In this case, when a direction in which the MFP 10 faces is changed, a positional relationship between the mobile terminal 50 in each of the lock orientation and the unlock orientation and the MFP 10 is changed. Accordingly, a direction sensor may also be mounted on the MFP 10. In the registration processing, a direction of the mobile terminal 50 in each of the lock orientation and the unlock orientation and a direction of the MFP 10 may be stored in association with each other, and in each of the login processing and the logout processing, the orientation of the mobile terminal 50 may be determined depending on the relative positional relationship between the mobile terminal 50 and the MFP 10.

<Other Modifications>

In the MFP 10 in the embodiment, each of the programs stored in the program storage area 18A of the storage 18 is executed by the CPU 17 to execute each processing to be executed by a controller in the present invention. However, a structure of the controller is not limited to this, and a part or a whole of the controller may be realized by hardware such as an IC (Integrated Circuit).

Further, the present invention may be realized not only as a mobile terminal but also as a program for executing processing by the mobile terminal. Furthermore, the program may be provided so as to be recorded on a non-transitory storage medium, or information or signals indicating the program may be transmitted through communication network such as Internet and so on.

What is claimed is:

1. An image processing apparatus configured to switch a state thereof between a first state and a second state, comprising:
    a processing unit configured to perform processing for image data, processing performed in the first state being different from processing performed in the second state;
    a communicator configured to communicate with a mobile terminal;
    a storage storing a first terminal identifier as a terminal identifier for identifying the mobile terminal, first orientation information indicating a first orientation of the mobile terminal, and second orientation information indicating a second orientation of the mobile terminal which is different from the first orientation, in association with each other, the first orientation corresponding to the first state, the second orientation corresponding to the second state; and
    a controller configured to:
    receive the first terminal identifier from the mobile terminal;
        successively receive orientation information indicating an orientation of the mobile terminal, from the mobile terminal through the communicator while the mobile terminal exists within a predetermined distance from the image processing apparatus;
    determine whether the controller receives the first orientation information in a state in which the state of the image processing apparatus is the first state;
    determine, in response to an occurrence of a first determination in which the controller receives the first orientation information in the state in which the state of the image processing apparatus is the first state, whether the controller receives the second orientation information in the state in which the state of the image processing apparatus is the first state, the controller receiving the second orientation information after the occurrence of the first determination; and
    switch, in response to an occurrence of a second determination in which the controller receives the second orientation information in the state in which the state of the image processing apparatus is the first state, the state of the image processing apparatus from the first state to the second state, the first orientation information and the second orientation information having been stored in the storage in association with the first terminal identifier in advance,
    wherein the storage is configured to store account information,
    wherein the controller is configured to receive the first terminal identifier, the first orientation information and the second orientation information from the mobile terminal through the communicator,
    wherein the controller is configured to:
        receive the first terminal identifier, the first orientation information and the second orientation information in the state in which the image processing apparatus is in the first state based on the account information; and
        store the first terminal identifier, the first orientation information and the second orientation information received by the controller, into the storage such that the first terminal identifier, the first orientation information, and the second orientation information are associated with the account information;
    wherein the first state is a login state of the account information, and
    wherein the second state is a logout state of the account information.

2. An image processing apparatus configured to switch a state thereof between a first state and a second state, comprising:

a processing unit configured to perform processing for image data, processing performed in the first state being different from processing performed in the second state;

a communicator configured to communicate with a mobile terminal;

a storage configured to store a terminal identifier for identifying the mobile terminal, first orientation information indicating a first orientation of the mobile terminal, and second orientation information indicating a second orientation of the mobile terminal which is different from the first orientation, in association with each other; and a controller configured to:

successively receive orientation information indicating an orientation of the mobile terminal, from the mobile terminal through the communicator; and switch the state of the image processing apparatus from one of the first state and the second state to another of the first state and the second state when the controller successively receives the first orientation information and the second orientation information from the mobile terminal identified by the terminal identifier, the first orientation information and the second orientation information being stored in the storage in association with the terminal identifier, wherein the communicator is configured to determine whether the communicator receives a response signal transmitted from the mobile terminal, and wherein the controller is configured to switch the state of the image processing apparatus to a state thereof at a point in time before the controller receives the first orientation information from the mobile terminal, when it is determined that the communicator does not receive the transmitted response signal after the controller receives the first orientation information from the mobile terminal and before the controller receives the second orientation information from the mobile terminal.

3. An image processing apparatus configured to switch a state thereof between a first state and a second state, comprising:

a processing unit configured to perform processing for image data, processing performed in the first state being different from processing performed in the second state;

a communicator configured to communicate with a mobile terminal;

a storage configured to store a terminal identifier for identifying the mobile terminal, first orientation information indicating a first orientation of the mobile terminal, and second orientation information indicating a second orientation of the mobile terminal which is different from the first orientation, in association with each other; and a controller configured to:

successively receive orientation information indicating an orientation of the mobile terminal, from the mobile terminal through the communicator; and switch the state of the image processing apparatus from one of the first state and the second state to another of the first state and the second state when the controller successively receives the first orientation information and the second orientation information from the mobile terminal identified by the terminal identifier, the first orientation information and the second orientation information being stored in the storage in association with the terminal identifier, wherein the storage is configured to store account information, wherein the controller is configured to receive the terminal identifier, the first orientation information and the second orientation information from the mobile terminal through the communicator, wherein the controller is configured to:

receive the terminal identifier, the first orientation information and the second orientation information in a state in which the image processing apparatus is in the first state based on the account information; and store the terminal identifier, the first orientation information and the second orientation information received by the controller, into the storage such that the terminal identifier, the first orientation information, and the second orientation information are associated with the account information, wherein the controller is configured to output, to the mobile terminal, an instruction for changing the mobile terminal to the first orientation, when the controller has received the terminal identifier from the mobile terminal, and wherein, the controller is configured to output, to the mobile terminal, an instruction for changing the mobile terminal to the second orientation, when the controller has received the first orientation information from the mobile terminal.

4. The image processing apparatus according to claim 3, wherein the controller is configured to switch the state of the image processing apparatus from the second state to the first state when the controller has received, from the mobile terminal identified by the terminal identifier stored in the storage, the second orientation information subsequently to the first orientation information stored in the storage in association with the terminal identifier in a state in which the image processing apparatus is in the second state.

5. The image processing apparatus according to claim 4, wherein the controller is configured to switch the state of the image processing apparatus from the first state to the second state when the controller has received, from the mobile terminal identified by the terminal identifier stored in the storage, the first orientation information subsequently to the second orientation information stored in the storage in association with the terminal identifier in a state in which the image processing apparatus is in the first state.

6. The image processing apparatus according to claim 3, wherein the controller is configured to switch the state of the image processing apparatus from one of the first state and the second state to another of the first state and the second state, when the controller has received the first orientation information predetermined consecutive times or more and the second orientation information predetermined consecutive times or more.

7. The image processing apparatus according to claim 3, wherein the orientation information is one of information indicating an inclination of the mobile terminal with respect to a vertical direction and information indicating a direction of the mobile terminal.

* * * * *